A. VAKULA.
AUTOMOBILE WHEEL CONSTRUCTION.
APPLICATION FILED AUG. 3, 1914.

1,131,185.

Patented Mar. 9, 1915.
2 SHEETS—SHEET 1.

Witnesses
C. Gygolak
J. N. Bryant.

Inventor
A. Vakula
A. M. Wilson
Attorney

A. VAKULA.
AUTOMOBILE WHEEL CONSTRUCTION.
APPLICATION FILED AUG. 3, 1914.
1,131,185.
Patented Mar. 9, 1915.
2 SHEETS—SHEET 2.
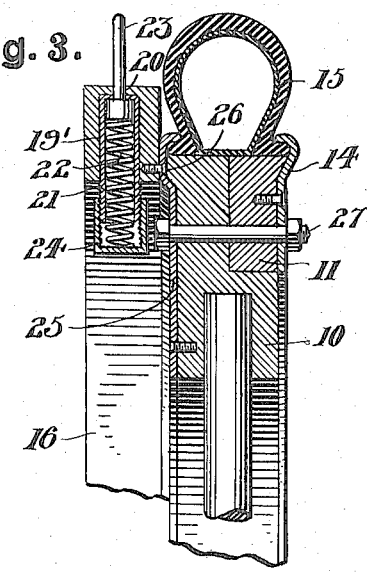
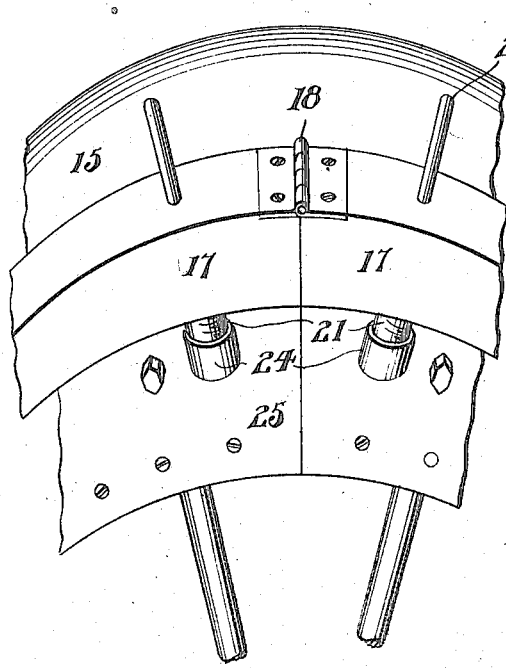
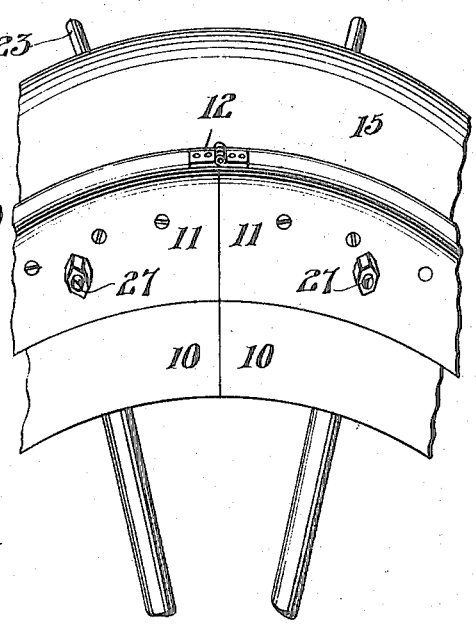
Witnesses
C. Gogolak
J. N. Bryant
Inventor
A. Vakula
By
A. M. Wilson
Attorney

UNITED STATES PATENT OFFICE.

ANDREW VAKULA, OF CARO, MICHIGAN.

AUTOMOBILE WHEEL CONSTRUCTION.

1,131,185.   Specification of Letters Patent.   Patented Mar. 9, 1915.

Application filed August 3, 1914. Serial No. 854,818.

*To all whom it may concern:*

Be it known that I, ANDREW VAKULA, a citizen of the United States, residing at Caro, in the county of Tuscola and State of Michigan, have invented certain new and useful Improvements in Automobile Wheel Construction, of which the following is a specification.

This invention relates to certain new and useful improvements in automobile wheel construction.

The primary object of this invention is to provide a non-skid auxiliary wheel member and provided with spring-pressed peripheral calks, and adapted to prevent side-slipping or skidding of the wheels.

A further object is to provide a non-skid wheel attachment formed in semi-circular sections, and attached to a wheel felly, having a removable rim member, which latter is also sectional and has its several parts hinged together.

A still further object is to provide a wheel member for detachably-mounting a pneumatic tire thereon and for also positioning resilient calk members adjacent thereto. It is furthermore important that the resilient calk members shall be arranged on the side of the wheel next to the vehicle for preventing an unsightly appearance when these calk members are being used.

A fourth object of the invention is to provide a device which may be applied to the inside of the wheel without removing the same from the axle.

With these general objects in view and others that will appear as the nature of the invention is better understood, the same consists in the novel combination and arrangement of parts hereinafter more fully described, illustrated in the accompanying drawings, and pointed out in the appended claim.

Figure 1:
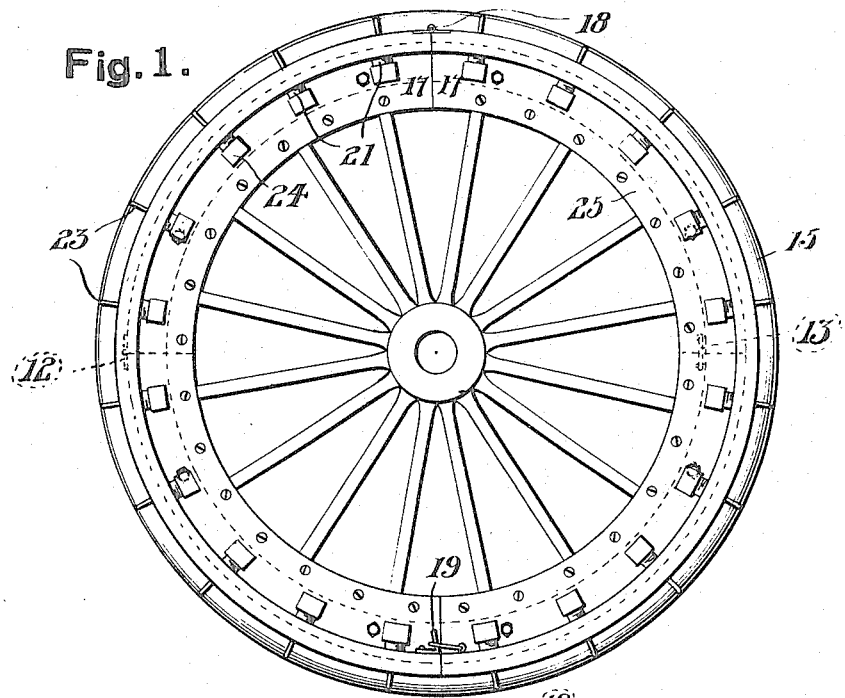
Figure 2:
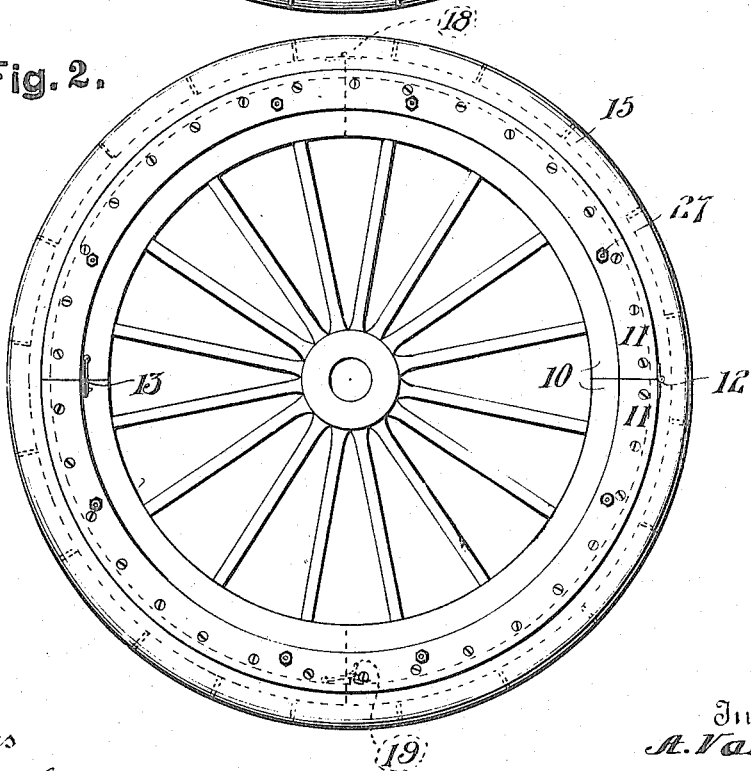

In the drawings forming a part of this application and in which like-designating characters refer to corresponding parts throughout the several views, Figure 1 is a side elevation of one face of the wheel. Fig. 2 is a side elevation of the opposite side of the wheel. Fig. 3 is a radial-sectional view upon a large scale of a portion of the wheel. Fig. 4 is an enlarged side elevation of a portion of the wheel, and Fig. 5 is a similar view of the opposite side of the wheel.

Referring more in detail to the drawings the felly 10 is provided in semi-circular sections and is provided with removable semi-circular peripheral-portions 11 which portions are connected together by hinges 12 at one side of the wheel and secured by a latch 13 at the diametrically-opposite side thereof. The removable sections 11 are provided with clencher-rim sections 14 whereby the pneumatic tire 15 is adapted to be mounted upon the felly as best illustrated in Fig. 3.

An auxiliary wheel 16 is provided formed in two sections 17 hinged together as at 18 at one side, and provided with a latch connection 19 at the other side thereof. This wheel 16 is rigidly mounted upon the wheel felly 10, and by reason of its hinged formation, the same may be positioned inwardly of the wheel if desired, and between the felly and the vehicle.

The wheel 16 is provided with a plurality of radial perforations 19′, having contracted outer openings 20. Tubular casings 21 are positioned within the perforations 19′, and are provided at their outer ends with openings in alinement with the said openings 20. Expansion springs 22 are positioned within the casing 21 and bear against calks 23, which are slidably positioned within the casing 21, and project through the outer openings of the casing and the said openings 20 of the wheel. A cover 24 is provided for the inner end of the casings 21, the said covers being screw-threaded thereon, and by means of which the tensions of the inclosed springs may be regulated. The wheel 16 is secured to the felly rim 25 by means of screws 26. The removable sections 11 are secured to the felly 10 by means of a plurality of bolts 27 and whereby the felly and rim detachable sections may be removed and then replaced.

With this detailed description of the device, it is thought that the complete operation of the invention will be fully understood. When desired to remove the tire from the wheel, the bolts 27 are released, and the felly sections 11, and rim sections 14 removed whereupon the tire is readily detached from the wheel. The spring mounting of the calks 23 peripherally of the wheel 16 allows the calks to be depressed upon contacting the roadway during a turning of the wheel, and the normal positions of the calks being with the outer ends in a plane with the tread portion of the tire, it will be seen that the depressing of the tire allows the ends of the calks to engage the roadbed while the springs 22 resiliently position the calks at each point of their contacting the same. The felly 10 may have the parts thereof separated and removed from the spokes if desired as the latch 19 secures together the sections of both the felly and the wheel 16. It will be noted that the detachable sections 11 are positioned so as to break joints with the separating points between the sections of the felly 10.

While the forms of the invention herein shown and described are what are believed to be the preferable embodiments thereof, it is nevertheless to be understood that minor changes may be made therein, without departing from the spirit and scope of the invention as set forth in the claim.

What I claim as new is:

A device of the class described comprising in combination with a wheel felly, an auxiliary rim secured to one side of the felly and embodying two semi-circular sections, said sections having two adjacent ends connected by a hinge on the exterior side thereof and the remaining ends detachably connected, said sections each also having a plurality of radial perforations therethrough, tubular casings within the perforations, headed calks slidably-mounted within the casings and extending outwardly of the periphery of the auxiliary rim, expansion springs within the casings and bearing against the inner end of the calks, and means upon the inner projecting ends of the casings for adjusting the tension of the springs.

In testimony whereof I affix my signature in presence of two witnesses.

ANDREW VAKULA.

Witnesses:
GEORGE A. GUNSELL,
DAVID A. SECOR.